United States Patent [19]
Rittler

[11] 3,839,053
[45] Oct. 1, 1974

[54] HIGHLY OPAQUE, TA2O5-CONTAINING GLASS-CERAMIC ARTICLES

[75] Inventor: Hermann L. Rittler, Horseheads, N.Y.

[73] Assignee: Corning Glass Works, Corning, N.Y.

[22] Filed: May 11, 1973

[21] Appl. No.: 359,432

[52] U.S. Cl.................. 106/39.6, 65/33, 106/52
[51] Int. Cl............................................. C03c 3/22
[58] Field of Search .............. 106/39.6, 39.8; 65/33

[56] References Cited
UNITED STATES PATENTS

| | | | |
|---|---|---|---|
| 3,252,811 | 5/1966 | Beall | 106/39.6 |
| 3,681,097 | 8/1972 | Beall | 106/39.6 |
| 3,681,102 | 8/1972 | Beall | 106/39.6 |

*Primary Examiner*—Helen M. McCarthy
*Attorney, Agent, or Firm*—Clinton S. Janes, Jr.; Clarence R. Patty, Jr.

[57] ABSTRACT

This invention relates to the production of glass-ceramic articles which exhibit a coefficient of thermal expansion of less than $15 \times 10^{-7}/°C$. over the temperature range of 25°–900°C. and which further exhibit a highly opaque, white appearance. Such articles are essentially alkali metal and alkaline earth metal free and have compositions within a narrowly-defined area of the $ZnO-Ta_2O_5-Al_2O_3-SiO_2$ field nucleated with $ZrO_2$.

3 Claims, No Drawings

HIGHLY OPAQUE, TA2O5-CONTAINING GLASS-CERAMIC ARTICLES

The manufacture of glass-ceramic articles is founded upon the heat treatment of glass articles to cause the crystallization in situ thereof and normally contemplates three overall process steps. Hence, a glass-forming batch, to which a nucleating agent is conventionally added, is melted. This melt is then simultaneously cooled to a glass and an article of a desired configuration shaped therefrom. The glass article is thereafter subjected to a predetermined heat treating schedule to cause the glass to crystallize in situ to a body composed of relatively uniformly-sized, fine-grained crystals homogeneously dispersed within a residual glassy matrix. In the usual practice, the heat treatment of the glass article will involve two steps. First, the article is heated to a temperature within or slightly above the transformation range of the glass to initiate the development of nuclei in the glass and then the article is heated to a temperature around the softening point of the glass or higher to promote the growth of crystals on the nuclei.

In general, a glass-ceramic article is predominantly crystalline, i.e., it is greater than 50 percent by weight crystalline. Therefore, the chemical and physical attributes thereof compare more closely with those of the crystal phase than with those of the parent glass. Furthermore, it is apparent that the residual glassy matrix will not only be small in amount but also will have a composition differing considerably from that of the parent glass since the components making up the crystal phase will have been precipitated therefrom. Finally, the crystallization in situ method of formation yields a crystalline body which is non-porous and free of voids.

U.S. Pat. No. 3,681,097 discloses the production of glass-ceramic articles having compositions within the $ZnO-Al_2O_3-SiO_2$ field nucleated with $ZrO_2$ and/or the noble metals wherein zinc petalite solid solution and/or beta-quartz solid solution comprise the predominant crystal phases. As is explained therein, the crystals were denominated zinc petalite inasmuch as the pattern thereof observed in an X-ray diffraction analysis appeared very similar to that exhibited by petalite ($LiAlSi_4O_{10}$). It has been hypothesized that these crystals are actually a solid solution phase comprised of a combination of $ZnAl_2Si_3O_{10}$, $ZnSi_2O_5$, and $ZnAl_2Si_8O_{20}$ which are zinc analogs of petalite.

The articles produced in accordance with that invention exhibited coefficients of thermal expansion over the temperature range of 25°–600°C. of about −5 to +20 × $10^{-7}$/°C. and, while being opaque, frequently did not demonstrate the high degree of opacity necessary to yield a completely opaque body in such thin cross section as ⅛ inch or less. Also, in numerous instances, the crystallized articles did not exhibit a pure white appearance but, rather, a brownish or grayish hue. Therefore, whereas the glass-ceramic articles disclosed in U.S. Pat. No. 3,681,097 possess very useful properties, there has been a need for bodies which would exhibit coefficients of thermal expansion of less than 15 × $10^{-7}$/°C. over a wide range of temperatures such as to provide them with practical utility at high temperatures, these bodies further demonstrating a dense, white opacity even when viewed in thin cross section.

U.S. application Ser. No. 359,431, filed concurrently herewith by the present inventor, discloses the manufacture of low expansion, densely-white glass-ceramic articles having base compositions narrowly circumscribed within the broad ranges cited in U.S. Pat. No. 3,681,097 but wherein AgCl is demanded as a nucleating agent.

The instant invention contemplates glass-ceramic articles containing zinc petalite and/or beta-quartz solid solution (s.s.) as the predominant crystal phase and exhibiting coefficients of thermal expansion approximating zero, i.e., no higher than 15 × $10^{-7}$/°C. and, preferably, within ±3 × $10^{-7}$/°C., over the broad temperature range of 25°–900°C. with very deep white opacity in cross sections as thin as ⅛ inch. The basis of the invention resides in this inclusion of about 1–10 percent by weight $Ta_2O_5$ to a narrow range of compositions within the $ZnO-Al_2O_3-SiO_2$ field nucleated with $ZrO_2$.

In carrying out the method steps, a batch for a glass consisting essentially, be weight on the oxide basis, of about 10–20 percent ZnO, 12–20 percent $Al_2O_3$, 50–65 percent $SiO_2$, 1–10 percent $Ta_2O_5$, and 2–8 percent $ZrO_2$ is first melted. The batch ingredients can comprise the oxides or any other materials which, when melted together, will be converted to the desired oxides in the proper proportions. The melt is then simultaneously cooled to at least within the transformation range thereof and a glass article shaped therefrom. The transformation range is that temperature at which a liquid melt is deemed to have been transformed into an amorphous solid, this temperature commonly being considered as lying in the vicinity of the annealing point of a glass. Finally, the glass article is exposed to a temperature above the transformation range for a sufficient length of time to secure the desired crystallization in situ, this crystallization temperature generally being between about 775°–950°C.

The crystallization process is dependent upon time and temperature. Thus, at temperatures within the hotter extreme of the effective range, a short exposure time will be adequate to achieve dense crystallization, e.g., one hour or even less. Conversely, where temperatures approaching the cooler extreme of the effective range are utilized, much more extended exposure times may be required to obtain the desired dense crystallization, e.g., up to 24–48 hours.

Crystallization temperatures above 950°C. are aschewed since the zinc petalite and beta-quartz solid solutions tend to become unstable and to convert to gahnite ($ZnO.Al_2O_3$), willemite ($2ZnO.SiO_2$), and/or cristobalite ($SiO_2$). Each of those latter phases exerts a sharp rising effect upon the coefficient of thermal expansion of the crystallized product, thereby precluding any possibility of securing a zero expansion body. Therefore, although some growth of those phases may occur at the lower crystallization temperatures, the amounts developed at those lower temperatures will be so small as to have a negligible overall effect upon the properties of the final product. The rate of crystal growth below 775°C. is generally so slow as to be unattractive from a practical point of view.

A two-step heat treatment process comprises the preferred practice. The glass article is first subjected to a temperature slightly above the transformation range, e.g., 725°–800°C., for a sufficient length of time to insure extensive nucleation and to initiate crystal growth. Thereafter, the article is heated to about 800°–950°C.

for a period of time sufficient to achieve essentially complete crystallization. This practice assures relatively uniformly-sized, fine-grained, dense crystallization. Commonly, a nucleation time of about 2–6 hours, succeeded by about 1–8 hours within the crystal growth range, has produced very highly crystalline bodies which demonstrate the desired deep white opacity.

The articles of the instant invention will be greater than 75 percent by weight crystalline and in the preferred embodiment will exhibit crystallization in excess of 90 percent. The crystals, themselves, are homogeneously dispersed within the residual glassy matrix and are relatively uniform in size, i.e., generally not exceeding about one micron in diameter and in the preferred embodiment not exceeding about ½ micron.

It will be recognized that numerous modifications in production technique are feasible. For example, after the melted batch has been cooled to at least within the transformation range and shaped into a glass article of a desired configuration, that article may then, alternatively, be further cooled to room temperature to permit visual inspection of glass quality before commencing the crystallization heat treatment or, if speed in production is of vital importance, the melt can only be quenched to a glass shape at a temperature approximating or immediately below the transformation range and the crystallization heat treatment begun at once. Furthermore, although the two-step heat treatment practice described above is the preferred process embodiment, very satisfactorily crystallized bodies can be achieved where the glass article is merely heated from room temperature or just below the transformation range to a temperature between 775°–950°C. and maintained within that latter temperature range for a period of time of sufficient length to yield a highly crystalline product. In general, however, articles produced in that manner will not contain crystals as uniformly fine-grained as can be obtained through the two-step procedure. Finally, although as a matter of convenience in production specific dwell periods at specific temperatures are utilized in the heat treatment process, such practice is not required. It is only necessary that the glass article be maintained within the crystallization range of 775°–950°C. for an adequate period of time to promote extensive crystal growth.

Inasmuch as the growth of the crystals is a function of time and temperature, the rate of heating the glass article above the transformation range must be controlled to avoid exceeding the rate of crystal growth. Otherwise, an insufficient number of crystals will be formed to support the article, with consequent deformation and slumping of the glass body as the softening point thereof is approached. Therefore, whereas heating rates of 10°C./minute have been successfully employed, particularly where physical supporting means such as formers have been utilized to prevent deformation of the glass bodies, heating rates of about 3°–5°C./minute have been found preferable. The latter heating rates have produced crystallized articles illustrating little, if any, physical deformation over the total composition range comprising the invention.

Table I lists compositions, expressed in weight percent on the oxide basis, of thermally crystallizable glasses which were heat treated according to the process steps of the present invention. The batch ingredients were compounded, ballmilled together to aid in obtaining a homogeneous melt, and then melted in open platinum crucibles for about 16 hours at temperatures ranging about 1,500°–1,600°C. Glass cane samples having a diameter of about ¼ inch were hand drawn from each crucible and the remainder of each melt poured onto a steel plate to yield a circular glass patty about 5 inches in diameter and ½ inch in thickness. The glass articles were immediately transferred to an annealer operating at 650°C.

After annealing, the articles were visually inspected for glass quality and then placed in an electrically-fired furnace for exposure to the heat treating schedules reported in Table II. At the conclusion of each schedule, the electric current to the furnace was cut off and the crystallized articles either removed directly from the furnace into the ambient atmosphere or merely, for convenience, left within the furnace and permitted to cool to room temperature therein. This latter practice, termed cooling at furnace rate, was estimated to average about 3°–5°C./minute.

The glass compositions listed in Table I are designed to demonstrate the criticality of maintaining the amounts of ZnO, $Al_2O_3$, $SiO_2$, and $Ta_2O_5$ within the aboverecited ranges to produce the desired densely-white, low expansion glass-ceramic articles. The presence of $ZrO_2$ in amounts less than about 3 percent by weight produced fairly coarse-grained bodies since nucleation was limited. Quantities of $ZrO_2$ in excess of about 8 percent by weight commonly lead to melting and glass quality problems. In accordance with conventional glass melting practice, $As_2O_3$ is employed as a fining agent.

TABLE I

| | 1 | 2 | 3 | 4 | 5 |
|---|---|---|---|---|---|
| $SiO_2$ | 55.4% | 59.3% | 59.4% | 60.4% | 57.4% |
| $Al_2O_3$ | 17.0 | 17.0 | 17.0 | 17.0 | 17.0 |
| ZnO | 15.0 | 15.0 | 15.0 | 15.0 | 15.0 |
| $Ta_2O_5$ | 5.0 | — | 5.0 | 4.0 | 3.0 |
| $P_2O_5$ | 1.0 | 2.0 | — | — | — |
| $ZrO_2$ | 6.0 | 6.0 | 3.0 | 3.0 | 7.0 |
| $As_2O_3$ | 0.6 | 0.7 | 0.6 | 0.6 | 0.6 |

| | 6 | 7 | 8 | 9 | 10 |
|---|---|---|---|---|---|
| $SiO_2$ | 50.4% | 64.4% | 61.4% | 59.4% | 59.4% |
| $Al_2O_3$ | 18.0 | 13.0 | 16.8 | 14.0 | 16.0 |
| ZnO | 15.0 | 12.0 | 14.8 | 18.0 | 16.0 |
| $Ta_2O_5$ | 10.0 | 7.0 | 3.5 | 5.0 | 5.0 |
| $P_2O_5$ | — | — | — | — | — |
| $ZrO_2$ | 6.0 | 3.0 | 2.9 | 3.0 | 3.0 |
| $As_2O_3$ | 0.6 | 0.6 | 0.6 | 0.6 | 0.6 |

Table II reports a particular heat treatment sequence employed in crystallizing each glass article along with a visual description of the final product, a measurement of the coefficient of thermal expansion determined over the range 25°–900°C. ($\times 10^{-7}$/°C.), and an identification of the primary crystal phases present as obtained through X-ray diffraction analysis reported in order of decreasing amounts. In each of the recorded firing schedules, the temperature was raised at the rate of about 5°C./minute to the cited dwell temperatures and the crystallized articles permitted to cool to room temperature at furnace rate.

TABLE II

| Example No. | Heat Treatment | Visual Description | Exp. Coeff. | Crystal phases |
|---|---|---|---|---|
| 1 | Heat to 900°C. Hold for 30 minutes Cool to 850°C. Hold for 6 hours Cool to 9oom temp. | Dense white opaque, very fine-grained crystals | −2.0 | Beta-quartz s.s., zinc petalite s.s. |
| 2 | Heat to 750°C. Hold for 4 hours Heat to 900°C. Hold for 4 hours Cool to room temp. | White translucent | 12.7 | Zinc petalite s.s., Beta-quartz s.s. |
| 3 | Heat to 850°C. Hold for 6 hours Cool to room temp. | Dense white opaque, very fine-grained crystals | 0.0 | Zinc petalite s.s., Beta-quartz s.s. |
| 4 | Heat to 850°C. Hold for 12 hours Cool to room temp. | Dense white opaque | 9.1 | Beta-quartz s.s., Zinc petalite s.s. |
| 5 | Heat to 900°C. Hold for 2 hours Cool to room temp. | Dense white opaque | 11.6 | Beta-quartz s.s., Zinc petalite s.s. |
| 6 | Heat to 850°C. Hold for 2 hours Cool to room temp. | Dense white opaque | 14.4 | Beta-quartz s.s., Zinc petalite s.s. |
| 7 | Heat to 850°C. Hold for 2 hours Heat to 875°C. Cool to room temp. | Dense white opaque | 7.3 | Beta-quartz s.s., Zinc petalite s.s. |
| 8 | Heat to 900°C. Hold for 1½ hours Cool to room temp. | Dense white opaque, very fine-grained crystals | −3.4 | Beta-quartz s.s., Zinc petalite s.s. |
| 9 | Heat to 850°C. Hold for 6 hours Cool to room temp. Heat to 850°C. Hold for 6 hours Cool to room temp. | Dense white opaque, very fine-grained crystals | 8.0 | Beta-quartz s.s., Zinc petalite s.s. |
| 10 | Heat to 750°C. Hold for 4 hours Heat to 850°C. Hold for 4 hours Cool to room temp. | Dense white opaque, very fine-grained crystals | 2.5 | Beta-quartz s.s., Zinc petalite s.s. |

An examination of Tables I and II, taken together, is believed to point out the critical compositional parameters which are vital to achieve the desired product. For example, a comparison of Examples 1 and 2, wherein 5% $Ta_2O_5$ was substituted for 5% $SiO_2$, clearly demonstrates the effect $Ta_2O_5$ exerts on opacity. $SiO_2$ constitutes the principal glass forming ingredient and is included to serve that function and to fill the stoichiometry of the crystal phases. Thus, the amount thereof present is related to the operable quantities of ZnO and $Al_2O_3$.

Whereas the full effect of the zinc petalite and/or beta-quartz solid solution crystal phases will only be felt in those glass-ceramic articles consisting solely of ZnO, $Al_2O_3$, $Ta_2O_5$, $SiO_2$, and $ZrO_2$, minor amounts of compatible metal oxides may be included for various purposes such as, for example, a melting aid or to modify the chemical and/or physical properties of the final product. The total of all such additions will not exceed 10% by weight and, preferably, ought to be held below 5% by weight. Individual additions of any such optional ingredient should not exceed 5% by weight.

$B_2O_3$ and $P_2O_5$ can act as glass formers and are effective as fluxes. PbO behaves as a flux and BeO is useful in lowering the liquidus of the melt and improving the surface quality of the crystallized bodies. The total of those four additions will, preferably, not exceed 5 percent by weight with BeO being held below 3% by weight.

The alkali metal oxides, particularly $Li_2O$, $Na_2O$, and $K_2O$, are desirably absent from the compositions due to their deleterious effect upon the dielectric properties of the crystallized products. Although very effective as melting aids, no more than 2 percent total can be tolerated even for that capacity. The alkaline earth metal oxides, particularly MgO, CaO, and SrO, are also desirably absent from the compositions due to their propensity to form solid solutions with the zinc petalite and betaquartz phases or to develop such undesirable new phases as spinel ($MgO.Al_2O_3$) which cause a rise in the coefficient of thermal expansion of the final product. Therefore, the total additions of those three oxides ought not to exceed 3 percent by weight with individual additions of no more than 2 percent by weight being tolerable. On the other hand, barium, being a heavier and less mobile element than magnesium, calcium, or strontium, does not react chemically as readily as the latter three elements. Nevertheless, even though not producing comparable unwanted crystal effects, the presence of BaO dilutes the overall properties of the crystallized body such that additions thereof will be held below 5 percent by weight.

Very minor amounts of $TiO_2$ can be substituted for $ZrO_2$ but, while a more efficient nucleating agent than $ZrO_2$, its substitution therefor can lead to the development of gahnite with a consequent rise in the coefficient of thermal expansion of the crystallized article. In view of the circumstance, no more than 2 percent by weight can be safely employed. Finally, whereas fine-grained crystalline bodies can be secured with 2% $ZrO_2$, to insure uniformly fine-grained crystallization at least 5 percent by weight $ZrO_2$ will normally be included as the nucleating agent. Amounts greater than 8% $ZrO_2$ hazard melting problems of the original glass.

In sum, Table II points out the vital role which $Ta_2O_5$ plays in the instant invention, viz., its capability of stabilizing the coefficient of thermal expansion over the cited ranges of components. This characteristic is of great practical importance in permitting relative flexibility in composition control while maintaining a low coefficient of thermal expansion. Furthermore, the presence of $Ta_2O_5$ assures a very densely-opaque, white body resulting from a very highly crystalline, fine-grained microstructure.

Example 1, subjected to the heat treatment schedule set out in Table II, constitutes the preferred embodiment of the invention. The final product exhibits a dense white opacity in sections as thin as 1/16 inch, resulting from a total crystallinity greater than 90 percent by weight and wherein the crystals are essentially all about 0.5 micron in diameter or less.

I claim:

1. A glass-ceramic article essentially free from alkali metal oxides and the alkaline earth metal oxides MgO, CaO, and SrO which exhibits a coefficient of thermal expansion over the range 25°–900°C. of less than 15 × $10^{-7}$/°C. and a dense white opacity in cross sections thinner than ⅛ inch, said dense opacity resulting from a crystal content greater than 75 percent by weight wherein said crystal content consists essentially of crystals having diameters not exceeding about 1 micron and being primarily selected from the group consisting of zinc petalite solid solution and beta-quartz solid solution, the composition of said article being substantially the same throughout and consisting essentially, by weight on the oxide basis, of about 10–20% ZnO, 12–20% $Al_2O_3$, 1–10% $Ta_2O_5$, 50–65% $SiO_2$, and 2–8% $ZrO_2$.

2. A method for making a glass-ceramic article essentially free from alkali metal oxides and the alkaline earth metal oxides MgO, CaO, and SrO which exhibits a coefficient of thermal expansion over the range 25°–900°C. of essentially zero and a dense white opacity in cross sections thinner than ⅛ inch, said dense opacity resulting from a crystal content greater than 75 percent by weight wherein said crystal content consists essentially of crystals having diameters not exceeding about 1 micron and being selected from the group consisting of zinc petalite solid solution and beta-quartz solid solution, which comprises the steps of:
   a. melting a batch for a glass consisting essentially, by weight on the oxide basis, of about 10–20% ZnO, 12–20% $Al_2O_3$, 1–10% $Ta_2O_5$, 50–65% $SiO_2$, and 2–8% $ZrO_2$;
   b. simultaneously cooling the melt to at least within the transformation range thereof and shaping a glass body therefrom;
   c. thereafter subjecting said glass body to a temperature between 775°–950°C. for a period of time sufficient to crystallize said glass body in situ throughout; and then
   d. cooling the crystallized body to room temperature.

3. A method according to claim 2 wherein said glass body is first exposed to a temperature between about 725°–800°C. for about 2–6 hours, thereafter subjected to a temperature between about 800°–950°C. for about 1–8 hours, and then cooled to room temperature.

* * * * *